R. PROELL.
APPARATUS FOR CONTROLLING ROTARY MACHINES.
APPLICATION FILED APR. 21, 1914.

1,130,431.

Patented Mar. 2, 1915.
2 SHEETS—SHEET 1.

Witnesses
Bertha M. Allen
J. B. Le Blanc

Inventor
Reinhold Proell
By Serrell Son
his attorneys

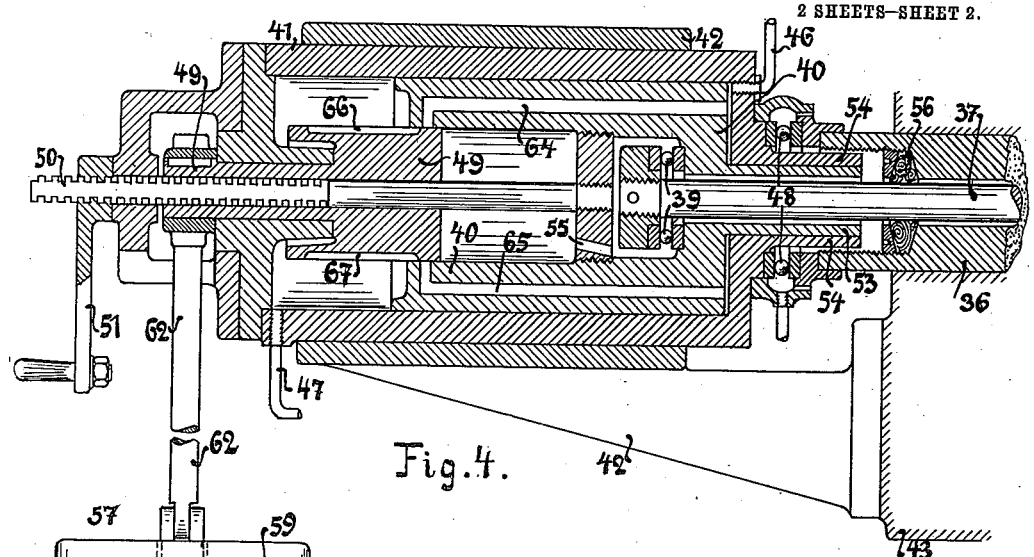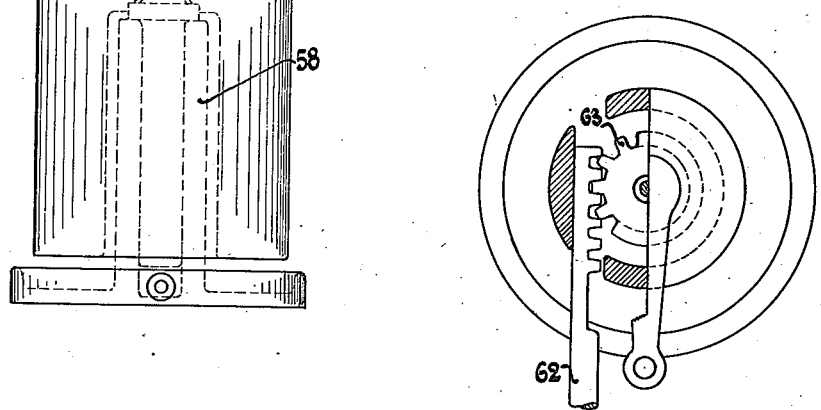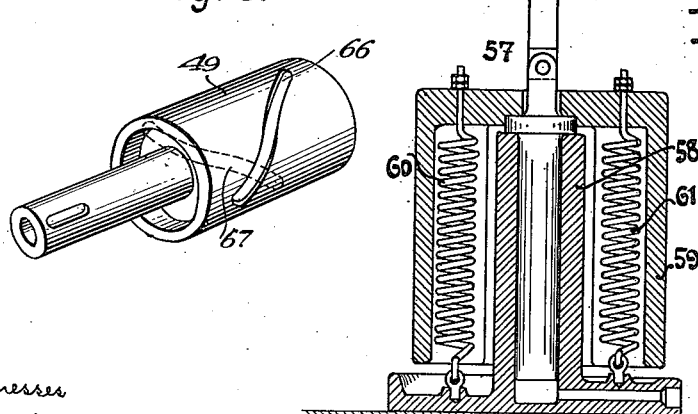

UNITED STATES PATENT OFFICE.

REINHOLD PROELL, OF DRESDEN, GERMANY.

APPARATUS FOR CONTROLLING ROTARY MACHINES.

1,130,431.  Specification of Letters Patent.  Patented Mar. 2, 1915.

Application filed April 21, 1914. Serial No. 833,423.

*To all whom it may concern:*

Be it known that I, REINHOLD PROELL, engineer, a subject of the King of Prussia, and resident of Rabenerstrasse 13, Dresden, Kingdom of Saxony, German Empire, have invented a new and useful Improvement in Apparatus for Controlling Rotary Machines, of which the following is a specification.

The present invention has for its object an apparatus for automatically controlling the number of revolutions of air compressors, pumps, or the like, driven by steam or gas engines, by a motive fluid the pressure of which is to be maintained between certain limits.

Especially the object of the present invention refers to engines provided with a centrifugal-governor formed or constructed as shaft-governor, but not to engines controlled by a centrifugal-governor formed as a spindle-governor for the reason that governors of the kind last mentioned generally necessitate low forces only, whereas the present invention has for its object to overcome intensive adjusting-resistances as found in shaft-governors.

A practical embodiment of the invention is represented in the accompanying drawings, in which—

Figure 1:
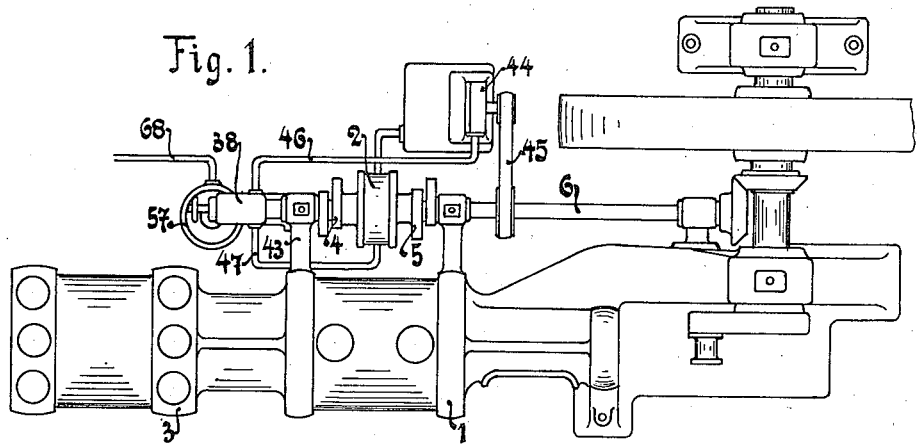
Figure 2:
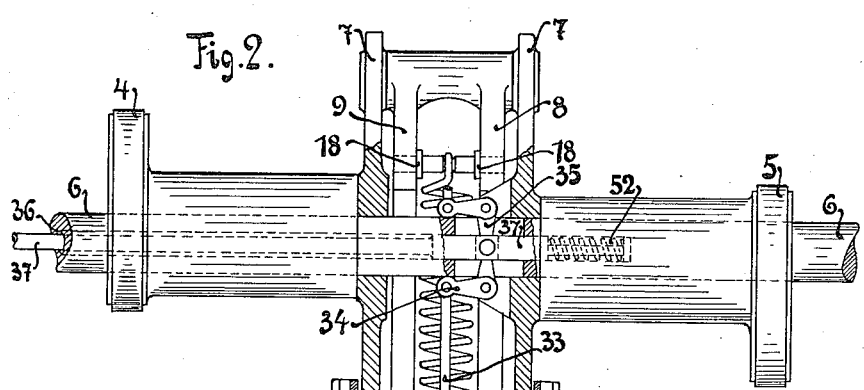
Figure 3:
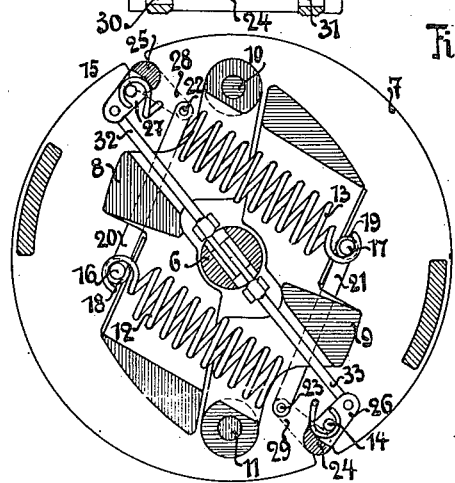

Figure 1 shows by way of example a compressor-plant driven by a steam-engine provided with a shaft-governor, Fig. 2 is a vertical longitudinal section, partly in elevation, through said shaft-governor, Fig. 3 is a transverse section showing more clearly the parts of said governor, Fig. 4 is a vertical longitudinal section through the servomotor working in combination with the shaft-governor, Fig. 5 is a detail of the pressure controlling apparatus belonging to the servomotor and Fig. 6 is a perspective view of the rotary valve forming part of the servo-motor.

1, Fig. 1, is a steam-engine provided with a shaft-governor 2 and driving a compressor 3 for sucking in and compressing air. Now, it is intended to automatically cause the engine to run with a higher or lower speed in correspondence with greater or smaller consumption of compressed air for the reason of maintaining as unvaried as possible the pressure within the compressed air-receiver. For this purpose, the shaft-governor 2, the controlling eccentrics 4, 5 of which are arranged on both of its sides, is provided with a device or apparatus causing the variation or adjustment of the revolutions in number during the operation of the compressor-plant. Said device or apparatus mainly consists of the carriers or disks 7, 7 joined together and fixed to the central shaft 6. These disks 7, 7 support two symmetrically arranged oscillating pendulums 8, 9 capable of oscillating around the bolts 10, 11 and held in equilibrium by the coiled springs 12, 13. One end of each of these coiled springs is connected to the stationary bolts 14, 15 and the other end of it to the movable bolts 16, 17 arranged to slide by the interposition of small rolls 18, 19 on the backs of the oscillating pendulums 8, 9 and carried, during the oscillating movement of the latter, in circles around the bolts 22, 23 by the operating rods 20, 21. The stationary bolts 14, 15 and the movable bolts 22, 23 form parts of the levers 24, 25 stretching the coiled springs and of the arms 26, 27, 28 and 29 of the levers mentioned. The position of the levers 24, 25 is maintained by the radial adjusting rods 32, 33 which prevent these levers themselves from making any rotary movement. The radial rods 32, 33 are supported by means of the bell-crank-levers 34, 35 or wedges, against an adjusting-spindle 37 arranged within a bore 36 of the governor-shaft 6 and projecting outward from the latter. The extremity of the adjusting spindle 37 is represented in Fig. 4 and the spindle itself is arranged within the servomotor 38 constructed as follows:

The spindle 37 is joined or coupled to the hollow piston 40 of the servomotor by a ball-bearing 39, said piston being guided oiltight within the cylinder 41 of the servomotor. This cylinder mentioned is supported within a bearing 42 fixed by screws to the bracket 43. The piston 40 is held under oilpressure caused or produced by a pump 44, Fig. 1, driven by the steam-engine 1 through belts 45 or pinions. Pipings 46, 47 supply the oil to the servomotor and away from it. In front of the one surface of the cylinder 41 another ball-bearing 48 is arranged for removing the axial thrust.

A rotary valve 49 projects into the hollow space of the piston 40 and is traversed in its central bore or opening by a spindle or screw 50 coupled to the piston. A crank or handle 51 or hand-wheel may be set on the projecting extremity of said spindle 11 serving to adjust the governor by hand for the number of revolutions desired at the time being during the period the oil-pressure fails to operate. A coiled spring 52, Fig. 2, is inserted within the bore of the governor-shaft 6 so that the spindle 37 need only undergo a stretching strain by the servomotor, said spring constantly returning the piston 40 to the end of its stroke. The front surface of the piston is provided with a tube-like projection 53 oil-tightly guided within the neck-shaped sleeve 54 of the cylinder 41. The partition arranged within the hollow piston 40 is traversed by a passage 55 by which the oil may flow through the ball-bearing 39 and through the tube-like projection 53 to the ball-bearing 48, from which it is returned to the oil-pump 44. The admission of oil to the shaft-governor is obviated by a leather-packing 56.

The rotary movement of the rotary slide 49 is derived from the pressure controlling device 57, shown in Fig. 1 and in Fig. 5, representing said device in longitudinal section and the servomotor in front elevation. A cylindrical vessel 58 is so arranged in a known manner as to contain a piston tightly movable and charged by a load 59 or coiled springs 60, 61. This piston is under the action of any suitable oily fluid under pressure of the compressed air. Said oily fluid overcomes by the increasing pressure the resistance caused by the charge or load 59 and raises the piston up to the end of its stroke. Said longitudinal movement of the piston is transmitted to the rotary valve 49 by a rack 62 and pinion 63 or similar transmitting means.

The action of the apparatus described is as follows: If the engine is started, the oil-pump begins to operate and produces or creates an oil pressure increasing together with the increasing number of revolutions. Said pressure is transmitted to the front surface of the piston 40, whereby the oil enters into the bores or passages 64, 65, provided in the body of the piston mentioned. Said bores or passages are in connection with the periphery of the rotary valve 49 and are first closed by said rotary valve so that the oil cannot be discharged. In consequence of this, the oil pressure will increase until it has surpassed or surmounted the resistance acting against the adjustment of the shaft-governor 2 and moves along the piston 40. The movement of this piston 40 will be continued until the mouths or openings of the bores or passages 64, 65 meet the helical grooves 66, 67, provided within the outer periphery of the rotary valve and shown in Fig. 6. One, two, or more of said grooves may be provided by which the oil is discharged and returned through the passage or pipe 47 to the oil pump 44. In this case, the oil-pressure maintained in front of the piston 40 is reduced at once and the movement of the piston is interrupted. In this position of the parts a constant throttle-action of the oily fluid is caused and the latter is discharged in such a small quantity only as is corresponding, at the time being to the resistance of the adjusting spindle 37. If now the valve 49 is rotated, the openings or mouths of the passages 64, 65 are further closed or opened. If said openings are closed, the pressure of the oily fluid is increased and the piston 40 further displaces the adjusting spindle 37 to the outside. If, however the openings or mouths are opened, the pressure of the oily fluid is reduced and the counter spring 52 displaces the piston 40 together with the adjusting spindle 37 to the interior of the shaft-governor, thus causing a turning movement of the levers 24, 25, whereby the tension and the actuating momentum of the coiled springs 12, 13 is reduced. In consequence of this, the revolutions are reduced in number.

It follows from the foregoing explanation that the controlling or governing action of the engine will take place as follows: If the engine is started there is no air-pressure as yet. The same only gradually begins to rise and acts on a vessel containing oily fluid under pressure from which said fluid is discharged to the pressure controlling apparatus by the piping 68, the movement of said apparatus operating the rotary valve 49. Some revolutions of the engine started will be sufficient to cause the pump 44 to produce a pressure of the oily fluid sufficient for displacing the piston 40 to the other end of its stroke for the reason that the rotary-valve shuts off, at the end of its stroke, the passages 64, 65 provided in the piston 40 mentioned. The coiled-springs 12, 13 of the shaft-governor are adjusted to their highest tension and momentum. Consequently, the revolutions of the engine rapidly increase in number up to the admissible maximum and the compressed air receiver forming part of the compressor is filled with said fluid as quickly as possible. As soon as the required air-pressure is obtained, the pressure-controller 57 begins to operate and the valve 49 is gradually rotated. The more said rotary movement of this valve 49 increases, the more the piston 40 returns to its original position in proportion to the increasing air-pressure, until the maximum of the pressure admissible is obtained when it again reaches said original position and adjusts the engine to the revolutions lowest in number. If however the consumption of compressed air or the like again increases, the pressure present within the compressed air receiver of the compressor 3 will be reduced and the revolutions of the engine are automatically increased in number by the air-pressure controller in such a manner that the revolutions in number of the engine are controlled according to the consumption of compressed air.

What I claim is:

1. In an apparatus for automatically controlling rotary machines by the pressure of a motive fluid, the combination with an engine-cylinder and a servomotor, of a shaft-governor controlling the charge of said cylinder, a hollow shaft carrying said governor, an adjusting spindle inclosed within the hollow shaft mentioned, a piston provided in the servomotor, a ball-bearing joining said piston direct with the adjusting spindle mentioned, a piping connecting the interior or chamber of the servomotor-cylinder with a pump supplying an oily fluid under pressure to the front of one side of the servomotor cylinder-piston.

2. In an apparatus for automatically controlling rotary machines by the pressure of a motive fluid, the combination with an engine-cylinder and a servomotor, of a shaft-governor controlling the charge of said cylinder, a hollow shaft carrying said governor, an adjusting spindle inclosed within the hollow shaft mentioned, a hollow piston arranged within the servomotor, a rotary valve, controlling said servomotor-piston, a rack and pinion connecting said rotary valve with a pressure controlling device, a ball-bearing joining said servomotor-piston direct with the adjusting spindle mentioned, a piping connecting the interior or chamber of the servomotor-cylinder with a pump supplying an oily fluid under pressure to one side of the servomotor-piston.

3. In an apparatus for automatically controlling rotary machines by the pressure of a motive fluid, the combination with an engine-cylinder and a servomotor, of a shaft-governor controlling the charge of said cylinder, a hollow shaft carrying said governor, an adjusting spindle inclosed within the hollow shaft, a hollow piston arranged within the servomotor and provided with axial passages, a pump supplying an oily fluid under pressure by said axial passages to the front of one side of the servomotor-piston, a rotary valve provided with helical grooves on its periphery and arranged to open or close the passages of the servomotor-piston, a rack and pinion connecting said rotary valve with a pressure controlling device and a ball-bearing joining said servomotor-piston direct with the adjusting spindle.

4. In an apparatus for automatically controlling rotary machines by the pressure of a motive fluid, the combination with an engine-cylinder and a servomotor, of a shaft-governor consisting of a stationary cylinder, a movable piston provided with passages, a rotary valve projecting into said cylinder, fly-bodies oscillating around stationary bolts fastened to rotating disks and loaded by coiled springs suspended with their stationary ends to bolts fastened to operating-levers insuring a permanent tension of the coiled springs movably guided with their ends during the oscillation of the fly-bodies, in a circle around bolts forming parts of pivoted rods and simultaneously increasing or reducing, by their simultaneous oscillating movement, the tension and the distance of the said coiled springs from the bolts or centers of the fly-bodies mentioned.

5. In an apparatus for automatically controlling rotary machines by the pressure of a motive fluid, the combination with an engine cylinder and a servomotor, of a shaft-governor, a hollow shaft supporting the fly-body weighted disks of said governor, an adjusting spindle inclosed within said hollow shaft, a hollow servomotor-piston and a ball-bearing direct receiving the reaction caused by the oil-pressure and taking place within the cylinder of the servomotor, from the shaft of the governor, which together with the servomotor forms a system represented by interior forces equilibrated to another only.

In testimony, that I claim the foregoing as my invention, I have signed my name in presence of two witnesses, this 2 day of April 1914.

REINHOLD PROELL.

Witnesses:
PAUL ARRAS,
CLAIRE SIMON.